(12) United States Patent
Jakob-Bodenhagen et al.

(10) Patent No.: US 8,556,053 B2
(45) Date of Patent: Oct. 15, 2013

(54) TWIN-CLUTCH FOR A TWIN-CLUTCH VARIABLE SPEED TRANSMISSION IN MOTOR VEHICLES

(75) Inventors: Mathias Jakob-Bodenhagen, Gaimersheim (DE); Hans-Peter Fleischmann, Stammham (DE); Tassilo Scholle, Ingolstadt (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 13/698,471

(22) PCT Filed: May 18, 2011

(86) PCT No.: PCT/EP2011/002471
§ 371 (c)(1),
(2), (4) Date: Nov. 16, 2012

(87) PCT Pub. No.: WO2011/144328
PCT Pub. Date: Nov. 24, 2011

(65) Prior Publication Data
US 2013/0056323 A1 Mar. 7, 2013

(30) Foreign Application Priority Data
May 19, 2010 (DE) .......................... 10 2010 021 036

(51) Int. Cl.
*F16D 25/08* (2006.01)
*F16D 25/10* (2006.01)

(52) U.S. Cl.
USPC ...................... 192/48.606; 74/330; 192/48.91

(58) Field of Classification Search
USPC ............. 192/48.602, 48.603, 48.607, 48.609, 192/48.611, 85.54, 85.51
See application file for complete search history.

(56) References Cited

U.S. PATENT DOCUMENTS

| | | | | | |
|---|---|---|---|---|---|
| 3,964,584 | A | * | 6/1976 | Bucksch ................... | 192/48.609 |
| 5,234,090 | A | * | 8/1993 | Haka ......................... | 192/70.252 |
| 5,735,376 | A | * | 4/1998 | Moroto et al. ........... | 192/48.607 |
| 5,908,096 | A | * | 6/1999 | Tsukamoto et al. ..... | 192/48.607 |
| 5,931,275 | A | * | 8/1999 | Kasuya et al. ............ | 192/85.54 |
| 7,036,645 | B2 | * | 5/2006 | Sowul et al. ............... | 192/48.91 |
| 2007/0240961 | A1 | | 10/2007 | Gremplini et al. | |

FOREIGN PATENT DOCUMENTS

| | | |
|---|---|---|
| DE | 198 30 951 A1 | 1/2000 |
| DE | 101 31 766 A1 | 8/2002 |

(Continued)

*Primary Examiner* — Rodney Bonck
(74) *Attorney, Agent, or Firm* — Henry Feiereisen LLC

(57) ABSTRACT

A twin-clutch for a twin-clutch variable speed transmission in motor vehicles includes two wet running multi-disk-clutches which are arranged axially in succession in a transmission housing, wherein end walls of the transmission housing are provided on respective sides of the multi disk clutches, a driving clutch housing; two transmission hubs outputting to transmission input shafts, and alternately drivingly connectable with the clutch housing via clutch disks; ring pistons shiftably supported in the end walls of the transmission housing and hydraulically pressurizeable with pressure oil via ducts arranged in the end walls to thereby cause a shifting of the ring pistons, wherein the ring pistons alternately act on the clutch disks via pressure disks, and wherein the pressure disks are actuatable from outside the clutch housing by the ring pistons; and axial rolling bearings respectively arranged between the ring pistons and the pressure disks.

16 Claims, 2 Drawing Sheets

(56) References Cited

FOREIGN PATENT DOCUMENTS

| DE | 101 46 606 A1 | 4/2003 |
| DE | 10 2005 027 467 A1 | 1/2006 |
| DE | 10 2006 060 738 A1 | 7/2007 |
| DE | 10 2006 010 113 A1 | 9/2007 |
| DE | 11 2007 002 842 T5 | 9/2009 |
| DE | 10 2008 060 580 A1 | 12/2009 |
| DE | 10 2009 047 953 A1 | 4/2011 |
| GB | 2 191 252 A | 12/1987 |
| WO | WO2011/019532 A2 | 2/2011 |

* cited by examiner

TWIN-CLUTCH FOR A TWIN-CLUTCH VARIABLE SPEED TRANSMISSION IN MOTOR VEHICLES

CROSS-REFERENCES TO RELATED APPLICATIONS

This application is the U.S. National Stage of International Application No. PCT/EP2011/002471, filed May 18, 2011, which designated the United States and has been published as International Publication No. WO 2011/144328 and which claims the priority of German Patent Application, Serial No. 10 2010 021 036.6, filed May 19, 2010, pursuant to 35 U.S.C. 119(a)-(d).

BACKGROUND OF THE INVENTION

The invention relates to a twin-clutch for a twin-clutch variable speed transmission in motor vehicles.

Such a twin-clutch with two multi-disk-clutches which are positioned axially adjacent one another is disclosed in DE 101 46 606 A1, in which a drum-shaped clutch housing as driving clutch element encloses two clutch hubs which are coupled via clutch disks, which clutch hubs are in driving relationship with two coaxial input shaft of the variable speed transmission. Such a transmission arrangement enables a symmetrical construction of many clutch elements by using identical components which are advantageous for manufacture. The multi-disk-clutch is actuated hydraulically by means of ring pistons which are integrated inside the clutch housing and the clutch disks which are pressurized via ducts in the input shafts of the transmission. This requires a significant sealing and manufacturing effort for effective control of the multi-disk-clutch and as the case may be for supplying the multi-disk-clutch with cooling oil.

DE 10 2005 027 467 A1 discloses a further device for the transmission of rotational torques which includes a positionally fixed piston and a rotatable engaging plate. The rotatable engaging plate is arranged adjacent to a rotatable housing and separated from the housing by a return spring arrangement. In a pre-loaded state, the return spring arrangement is nested between the engaging plate and the rotatable housing.

SUMMARY OF THE INVENTION

The object of the invention is to propose a twin-clutch which has a robust construction and whose hydraulic actuation and as the case may be, supply with cooling oil is simpler and easier with regard to manufacture.

This object is solved according to the invention by the features of patent claim 1. Advantageous refinements are set forth in the further patent claims.

According to the invention, it is proposed that the ring pistons are shiftably supported in end walls of the clutch housing provided on both sides of the multi-disk-clutches, and supplied with pressure oil via ducts arranged in the end walls, and that a respective axial rolling bearing is arranged between the ring pistons and the pressure discs which are pressurized from outside the clutch housing. Appropriate constructing of the clutch housing and the use of a rolling bearing for each multi-disk-clutch allows reconfiguration of the clutch actuation so that sealing elements which are exposed to relative rotations (for example piston rings) are not required and corresponding supply ducts and sealing arrangements in the transmission input shafts are not needed. The pressure-oil and optionally, cooling-oil supply can be achieved via supply ducts which are integrated in the clutch housing, and enables an improved pressure-oil supply with corresponding direct, sensitive actuation of the transmission.

Particularly advantageously, the drum-shaped clutch housing can be fixedly connected to the drive shaft via a central hub and configured open on one side, wherein the two multi-disk-clutches and the two pressure discs are insertable and the outer pressure disc can be correspondingly actuated from the open side.

Further, the pressure disc of one of the multi-disk-clutch which faces toward the closed front side of the clutch housing can be actuated from outside with radially inward protruding arms through corresponding recesses in the end wall of the clutch housing. This allows actuating the multi-disk-clutches from both sides via their pressure discs in spite of a central drive of the clutch housing.

In a structurally and constructively simple manner, the ring pistons can have ring sections with an L-shaped cross section, on which ring sections the rolling bearings are guided. The ring sections can preferably be molded directly to the ring pistons.

Further, the ring pistons which have a U-shaped cross section can carry ring cuffs which surround the ring pistons, and be inserted in a liquid tight manner in ring groove shaped recesses of the end wall of the clutch housing, into which the ducts for the supply with pressure-oil and optionally cooling-oil also lead. For the cooling oil, outlet openings can be provided which may be controlled via the ring pistons.

Further, the ring-shaped, or in circumferential direction interrupted, surfaces of the pressure discs which contact the pressure rings of the axial rolling bearing can be configured spherical in cross section in order to create a low-wear introduction of force from the pressure rings into the pressure discs.

In a particularly advantageous refinement of the invention, the clutch disks can be alternately formed by steel disks and drive plates which have a friction lining on both sides, which drive plates are connected to the clutch housing or the clutch hubs in circumferential direction in a form fitting manner, wherein radially outside or inside the friction linings, ring shaped return springs are arranged which separate the clutch disks, and are configured as plate springs or corrugated disks. The return springs of the proposed type enable a fast and yet particularly sensitive control of the clutch torques in the multi-disk clutches, which is particularly advantageous in twin-clutch transmissions due to the partially overlapping torque transmission.

Manufacturing-wise and functionally particularly advantageously, the two clutch hubs can be formed by ring elements which have an L-shaped cross section, and whose radial flanges are connected with hollow shaft sections of the input shafts of the variable speed transmission. In addition to the mounting advantages resulting there from when assembling the twin-clutch, the clutch hubs can be manufactured as extrusion parts of same geometry and can constructively advantageously be integrated into the clutch housing.

The further patent claims describe a particularly advantageous rolling bearing of the clutch elements which are connected to the transmission shafts with a support which is to the greatest degree relieved of bending moments even at high torque transmissions.

BRIEF DESCRIPTION OF THE DRAWING

In the following, an exemplary embodiment of the invention is explained in more detail with further details. The schematic drawing shows in.

DETAILED DESCRIPTION OF PREFERRED EMBODIMENTS

Figure 1:
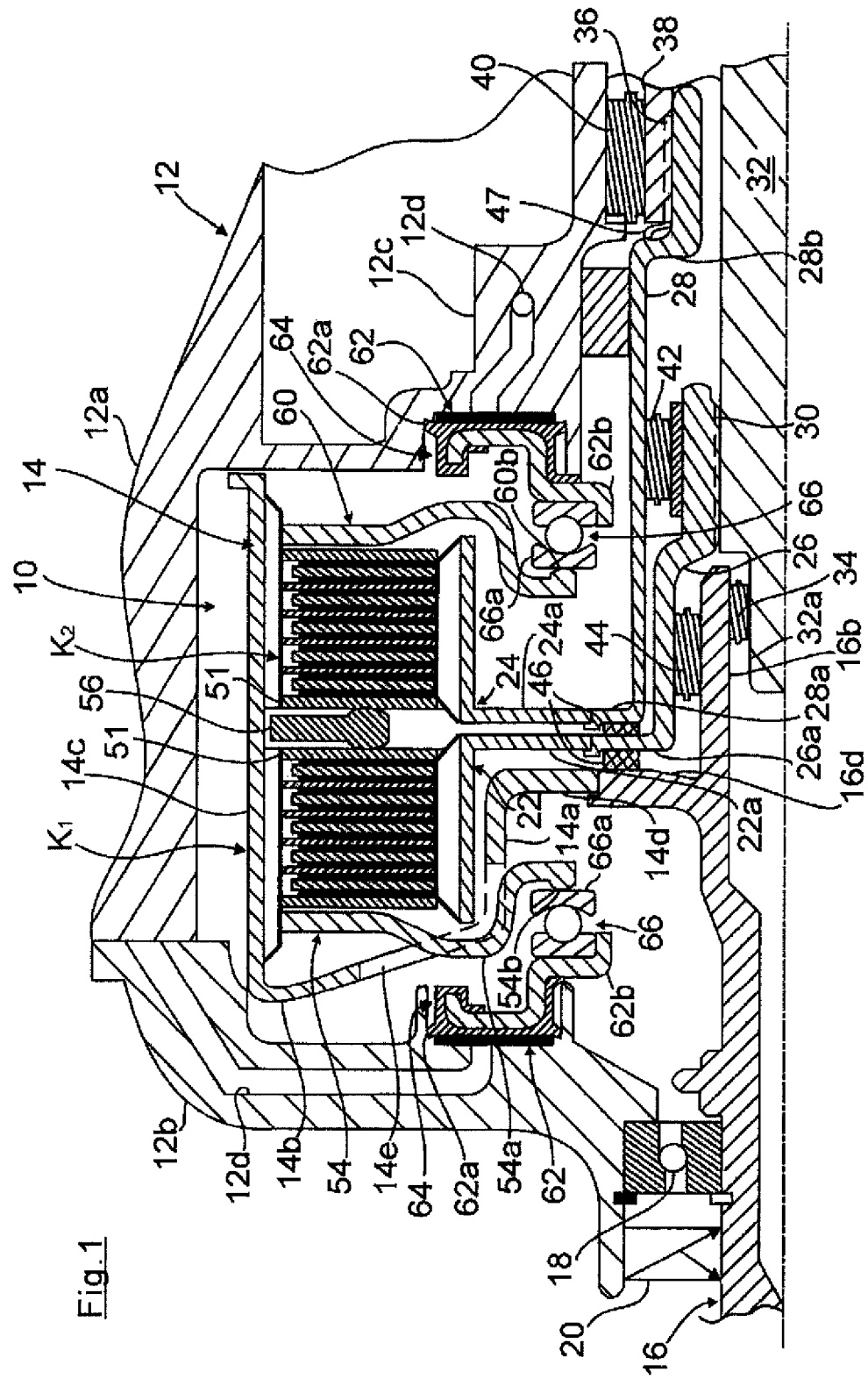
FIG. 1 in a longitudinal section the upper half of a twin-clutch for a twin-clutch variable speed transmission in a motor vehicle with two multi-disk clutches.

In FIG. 1, 10 designates a twin-clutch for a not shown twin-clutch variable speed transmission for motor vehicles, which is arranged in a clutch housing 12. A housing section 12a which encloses the twin-clutch 10, and a housing cover 12b are mounted inside a clutch case (not shown) to the clutch housing 12 or its end wall 12c.

The twin-clutch 10 has two wet-running multi-disk-clutches K1 and K2 which are arranged inside a drum-shaped clutch housing 14.

The driving clutch housing 14 is formed by a radial inner central hub 14a, a radial flange 14b and an outer cylinder 14c. The central hub 14a further has an inwardly protruding flange section 14d which is fixedly connected to a connection flange 16d which is molded to a drive shaft 16 and extends radially outwardly.

The drive shaft 16 is, in a manner which is not shown, for example via a rotational swinging muffler or a two mass swinging wheel, connected to the crank shaft of an internal combustion engine and drives the clutch housing 14 of the twin-clutch 10.

The drive shaft 16 is rotatably supported in the housing cover 12b via an axially and radially guiding ball bearing 18 (four-point bearing) and sealed against the outside by means of an inserted shaft seal ring 20.

Inside the clutch housing 14, the two driven clutch hubs 22, 24 of the multi disk clutches K1, K2 are arranged which are each formed by ring parts which have an L-shaped cross section, and whose radially inward protruding flange sections 22a, 24a are connected with connection flanges 26a, 28a of hollow shaft sections which are arranged coaxially to one another.

The inner hollow shaft section 26 is drivingly connected with a first input shaft 32 of the variable speed transmission via a plug-in gearing 30, wherein a projection 32a of the input shaft 32 with a small cross section protrudes into a section 16b of the drive shaft 16 which is extended via the flange section 16a and is rotatably supported in a rolling bearing arranged there between.

The outer hollow shaft section 28 is drivingly connected to the second input shaft 38 via a further plug-in gearing 36, wherein a radial rolling bearing 40 which interacts with the input shaft 38 is arranged in the region of the plug-in connection, and is inserted into a bearing receptacle of the end wall 12b of the clutch housing 12.

Between the two hollow shaft sections 26, 28 and between the extended section 16b of the drive shaft 16 and the inner hollow shaft section 26, two further radial rolling bearings 42, 44 are arranged which ensure a rigid support of the clutch elements and the transmission shafts.

Further, axial rolling bearings 46 are provided between the radial flanges 26a, 28a of the hollow shaft sections 26, 28 and between the flange section 16a of the drive shaft 16 and the radial flange 26 which is directly adjacent the flange section 16a, and the drive shaft 16, which axial rolling bearings 46 support the axial forces and axial torques which occur at the clutch elements. A disc spring 47 which is arranged between the outer hollow shaft section 28 on a ring shoulder 28b and on the front side of the further extending input shaft 38 of the variable speed transmission exerts a defined pretension on the axial rolling bearings 46, which excludes play.

As can be seen from FIG. 1, the mentioned radial rolling bearings 34, 40, 42, 44 are formed by needle bearings; the same is true for the axial rolling bearings 46.

Figure 2:
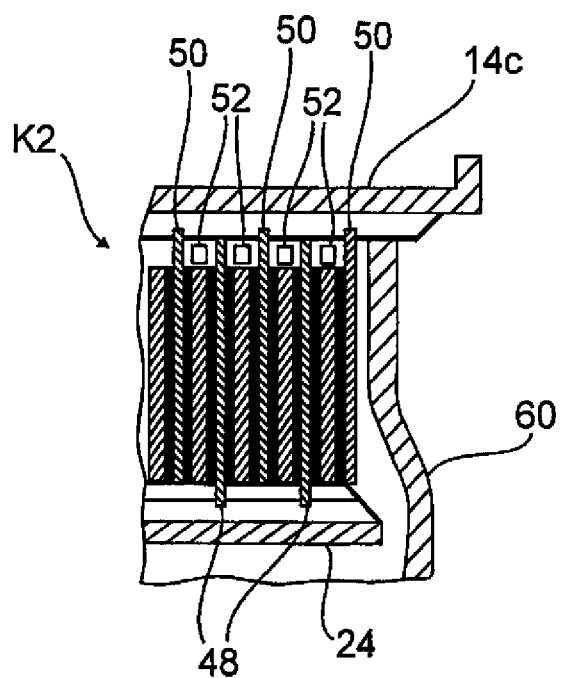
FIG. 2 a section of the multi-disk clutches of one of the multi-disk clutches with inserted corrugated disc as return spring.

Incorporated into the outer cylinder 14c of the clutch housing 14 which is open on one side, and on the transmission hubs 22, 24 are axially parallel grooves (without reference signs), into which steel disks 48 (see enlarged section according to FIG. 2) and steel drive disks 50 which carry friction linings (hatched) as clutch disks alternately protrude in circumferential direction.

The friction linings on the drive disks 50 are configured so as to be radially outwardly set back, and corrugated disks are inserted into the ring shaped intermediate spaces formed thereby, which corrugated disks act as return springs or push the clutch disks 48 50 apart in the open state. Instead of the corrugated disks 52, disk springs can also be used.

The multi-disk clutches K1, K2 (FIG. 1) are mounted from the open side of the clutch housing 14, wherein as can be seen, the multi disk clutch K1 is inserted first with a radially inwardly extending pressure disk 54 and thereafter, as shown, the clutch disks 48, 50 and finally a stop disk 51.

Then, a ring shaped separation element 56 is securely inserted into the outer cylinder 14c of the clutch housing 14 which ring-shaped separation element 56 functionally separates the two multi-disk clutches K1, K2 and for example is held pushed-in and/or axially unmovable via securing rings.

Thereafter, the multi-disk clutch K2 is mounted in reverse order and connected to its pressure disc 60. With the mounting of the clutch discs 48 50 the mentioned corrugated discs are of course also inserted (not shown in FIG. 1 for reasons of better clarity).

While the pressure disk, which is on the right side in FIG. 1 covers the open side of the clutch housing 14, arms 54a which are radially inwardly molded onto the left pressure disk 54, (for example three arms—not visible in the sectional drawing) extend through corresponding recesses 14e in the end wall 14b of the clutch housing 14 toward the outside.

The hydraulic actuation of the two multi disc clutches K1, K2 occurs via ring pistons 62 on both sides which are arranged axially shiftable in ring grooves 64 of the end wall 12c of the clutch housing 12 or in the transmission cover 12b. The ring pistons 62 which have a U-shaped cross section are covered with rubber elastic sealing cuffs 62a and are inserted into the ring grooves in a liquid tight manner.

The hydraulic pressurization of the ring pistons 62 occurs via ducts 12d provided in the transmission cover 12b and the end wall 12c, which ducts 12d are connected to a not shown transmission control with corresponding control valves and a source for pressure means. At the same time these ducts 12d can serve for supplying cooling-oil to the clutch housing 14, with corresponding outlet openings.

Ring sections 62b which have an L-shaped cross section are molded to the ring pistons 62, on which ring sections 62b pressure bearings or axial rolling bearings 66 are held. The axial rolling bearings 66 which are configured as ball bearings, act with their free pressure rings 66a on spherically configured contact surfaces 54b, 60b of the pressure disks 54, 60 of the two multi-disk-clutches K1, K1. The mentioned contact surfaces 54b of the left pressure disk 54 are not ring-shaped as in the case of the right pressure disc, but rather distributed across the circumference on the arms 54a of the pressure disk 54.

When one of the multi-disk clutches K1, K2 is to be closed, the corresponding ring piston 62 is pressurized with pressure-oil via the transmission control, so that the corresponding pressure disk 54, 60 compresses the clutch disks 48, 50 and the corrugated disks 52 via the axial rolling bearing 66.

As a result, torque is increasingly transferred from the drive shaft 16 and the clutch housing 14 via one of the transmission hubs 22, 24 to one of the input shafts 32, 36 of the variable speed transmission.

When the twin-clutch 10 is to be switched, the multi-disk clutch (for example K1) which is closed at his point, is opened and almost without interruption of the pulling force, the other multi-disk-clutch is closed. The return force of the used corrugated disks 52 ensures a fast opening of the then inactive multi-disk-clutch (K1)

What is claimed is:

1. A twin-clutch for a twin-clutch variable speed transmission in motor vehicles, comprising:
   two wet running multi-disk-clutches which are arranged axially in succession in a transmission housing, wherein end walls of the transmission housing are provided on respective sides of the multi disk clutches;
   a driving clutch housing;
   two transmission hubs outputting to transmission input shafts, and alternately drivingly connectable with the clutch housing via clutch disks;
   ring pistons shiftably supported in the end walls of the transmission housing and hydraulically pressurizeable with pressure oil via ducts arranged in the end walls to thereby cause a shifting of the ring pistons, said ring pistons alternately acting on the clutch disks via pressure disks, said pressure disks being actuatable by the ring pistons from outside the clutch housing and;
   axial rolling bearings respectively arranged between the ring pistons and the pressure disks.

2. The twin-clutch of claim 1, wherein the clutch housing is drum-shaped and securely connected with a drive shaft via a central hub and is constructed to have one open side, and wherein the two multi-disk-clutches and the two pressure disks are insertable into the clutch housing from the open side.

3. The twin-clutch of claim 2, wherein one of the pressure disks which faces toward a closed end side of the clutch housing is actuatable from outside the clutch housing with radially inward protruding arms through corresponding recesses in an end wall of the clutch housing.

4. The twin-clutch of claim 1, wherein the ring pistons have ring sections which have an L-shaped cross section, and wherein the axial rolling bearings are guided on the ring sections.

5. The twin-clutch of claim 1, wherein the ring pistons have a U-shaped cross section and carry ring cuffs which surround the ring pistons, wherein the ring pistons are inserted into annular groove-shaped recesses of the end walls in a liquid tight manner, and wherein the ducts lead into said annular groove-shaped recesses.

6. The twin-clutch of claim 5, wherein the ducts are configured for supplying cooling-oil.

7. The twin-clutch of claim 1, wherein surfaces of the pressure disks with which the pressure disks contact the pressure rings of the axial rolling bearings are ring shaped or interrupted in a circumferential direction, and are configured to have a spherical cross section.

8. The twin-clutch of claim 1, further comprising return springs for separating the clutch disks, wherein the clutch discs are alternately formed by steel discs and drive discs provided with a friction lining on both sides, said drive discs being connected in circumferential direction with the transmission housing or the transmission hubs in a form fitting manner, and wherein the return springs are arranged radially inside or outside of the friction linings.

9. The twin-clutch of claim 8, wherein the return springs are formed by disk springs.

10. The twin clutch of claim 8, wherein the return springs are formed by corrugated disks.

11. The twin-clutch of claim 1, wherein the two transmission hubs are formed by ring parts which have an L-shaped cross section, and wherein a radial flange of the transmission hubs is securely connected to hollow shaft sections of the input shafts of the variable speed transmission.

12. The twin-clutch of claim 1, wherein a respective axial rolling bearing is arranged between adjacent connection flanges of hollow shaft sections of the input shafts and between a connection flange of a drive shaft which protrudes into the clutch housing and is fixedly connected with a central hub of the clutch housing.

13. The twin-clutch of claim 12, wherein the drive shaft has an extended section which extends past a connection flange for the central hub, and wherein a respective radial rolling bearing is inserted between said extended section and the hollow shaft sections.

14. The twin-clutch of claim 13, wherein an outer one of the hollow shaft sections is connected to a further extending hollow input shaft of the variable speed transmission via a plug-in gearing and wherein a corresponding radial rolling bearing is arranged in a region of the plug-in gearing and in a corresponding one of the end walls of the transmission housing.

15. The twin-clutch of claim 12, wherein a radially inner one of the hollow shaft sections is connected with a radially inner one of the transmission input shafts of the variable speed transmission via a plug-in toothing and is additionally guided in the extended section of the drive shaft via a radial rolling bearing.

16. The twin-clutch of claim 12, further comprising a disk spring inserted between a radially outer one of the hollow shaft sections and a further extending input shaft of the variable speed transmission, said disk spring axially pretensioning the radially outer hollow shaft section against the drive shaft.

* * * * *